(12) United States Patent
Linzmeier et al.

(10) Patent No.: US 6,521,688 B1
(45) Date of Patent: *Feb. 18, 2003

(54) LASER-MARKABLE PLASTICS

(75) Inventors: Rainer Linzmeier, Gross-Zimmern (DE); Burkhard Krietsch, Dieburg (DE); Frank Prissok, Lemförde (DE)

(73) Assignees: Merck Patent Gesellschaft mit beschrankter Haftung, Darmstadt (DE); BASF Aktiengesellschaft, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 08/953,796

(22) Filed: Oct. 17, 1997

Related U.S. Application Data

(63) Continuation of application No. 08/732,448, filed on Nov. 4, 1996, now abandoned.

(30) Foreign Application Priority Data

May 5, 1994 (DE) ............................................ 44 15 802

(51) Int. Cl.[7] ............................. C08K 3/00; C08K 3/20

(52) U.S. Cl. ........................ 524/430; 524/440; 524/408; 524/409; 524/449; 428/403; 523/137

(58) Field of Search .................................. 524/430, 440, 524/408, 409, 449; 428/403; 523/137

(56) References Cited

U.S. PATENT DOCUMENTS

| | | | | | |
|---|---|---|---|---|---|
| 4,568,609 A | * | 2/1986 | Sato et al. | ................... | 428/403 |
| 5,320,781 A | * | 6/1994 | Stahlecker et al. | ......... | 252/518 |
| 5,350,448 A | * | 9/1994 | Dietz et al. | .................. | 106/441 |
| 5,373,039 A | * | 12/1994 | Sakai et al. | .................... | 522/78 |
| 5,578,120 A | * | 11/1996 | Takahashi et al. | .......... | 106/438 |
| 5,630,979 A | * | 5/1997 | Welz et al. | .................. | 264/400 |
| 6,214,917 B1 | * | 4/2001 | Linzmeier et al. | .......... | 524/430 |

* cited by examiner

*Primary Examiner*—James J. Seidleck
*Assistant Examiner*—Olga Asinovsky
(74) *Attorney, Agent, or Firm*—Millen, White, Zelano & Branigan, P.C.

(57) ABSTRACT

The present invention relates to laser-markable plastics, in particular thermoplastic polyurethanes, which are distinguished by the fact that they contain pigments having a coating of doped tin dioxide.

14 Claims, No Drawings

LASER-MARKABLE PLASTICS

This application is a continuation of application Ser. No. 08/732,448, filed Nov. 4, 1996 abandoned, which is a National Phase PCT application of EP 95 01672, filed May 5, 1995.

The present invention relates to laser-markable plastics which are distinguished by the fact that they contain pigments having a coating of doped tin dioxide.

The labelling of products is becoming of increasing importance in virtually all sectors of industry. Thus, for example, production dates, use-by dates, bar codes, company logos, serial numbers, etc., must frequently be applied. At present, these marks are predominantly made using conventional techniques such as printing, embossing, stamping and labelling. However, the importance of non-contact, very rapid and flexible marking using lasers, in particular in the case of plastics, is increasing. This technique makes it possible to apply graphic inscriptions, for example bar codes, at high speed even on a non-planar surface. Since the inscription is in the plastic article itself, it is durable and abrasion-resistant.

Many plastics, for example polyolefins and polystyrenes, have hitherto proven to be very difficult or even impossible to mark by means of lasers. A $CO_2$ laser which emits light in the infrared region at 10.6 $\mu$m produces only a weak, virtually illegible mark in the case of polyolefins and polystyrenes, even at very high output. In the case of the elastomers polyurethane and polyether-esters, Nd-YAG lasers produce no interaction, and $CO_2$ lasers produce an engraving. The plastic must not fully reflect or transmit the laser light, since no interaction then occurs. Neither, however, can there be strong absorption, since in this case the plastic evaporates and only an engraving remains. The absorption of the laser beams and thus the interaction with the material depends on the chemical structure of the plastic and the laser wavelengths used. It is in many cases necessary to add appropriate additives, for example absorbers, to make plastics laser-inscribable.

The laser labelling of plastics is increasingly being carried out using Nd-YAG lasers in addition to $CO_2$ lasers. The YAG lasers usually used emit a pulsed energy beam having a characteristic wavelength of 1064 nm or 532 nm. The absorber material must exhibit pronounced absorption in this specific NIR region in order to exhibit an adequate reaction during the rapid inscription operations.

DE-A 29 36 926 discloses that the inscription of a polymeric material by means of laser light can be achieved by admixing the plastic with a filler which discolours on exposure to energy radiation, such as carbon black or graphite.

EP 0 400 305 A2 describes highly polymeric materials which can be inscribed by means of laser light and which contain copper(II) hydroxide phosphate or molybdenum(VI) oxide as discolouring additive.

A plastic moulding composition based on an organic thermoplastic polymer and containing a black pigment and which can be provided with characters by exposure to laser radiation is disclosed in EP 0 522 370 A1.

However, all the fillers known from the prior art have the disadvantage that they durably colour the plastic to be inscribed and consequently the laser inscription, which is usually a dark script on a paler background, is then no longer sufficiently high in contrast.

The filler or the successful absorber should therefore have a very pale inherent colour or need only be employed in very small amounts. The contrasting agent antimony trioxide satisfies such criteria. U.S. Pat. No. 4,816,374 employs antimony trioxide for laser inscription in thermoplastic elastomers by means of Nd-YAG lasers. It is employed in a concentration of from 3 to 8%, depending on the matrix material and the writing speed of the laser. Laser marking is possible using cadmium and arsenic compounds, but such substances are no longer used owing to their toxicity.

The object of the present invention was therefore to find laser-markable plastics which enable high-contrast marking on exposure to laser light and contain only small amounts of heavy metals.

Surprisingly, it has been found that thermoplastics containing pigments which have a coating of, for example, antimony-doped tin dioxide enable high-contrast marking with sharp edges.

The invention therefore relates to laser-markable plastics which are characterized in that thermoplastics contain pigments having a doped tin dioxide coating.

The addition of the pigments in concentrations of from 0.1 to 4% by weight, preferably from 0.5 to 2.5% by weight, in particular from 0.3 to 2% by weight, based on the plastic system, achieves a contrast on laser marking which corresponds to or is even superior to that of a plastic containing significantly more antimony trioxide in terms of concentration. However, the concentration of the pigments in the plastic depends on the plastic system employed. The small proportion of pigment changes the plastic system insignificantly and does not affect its processing properties.

The tin dioxide coating of the pigments is preferably doped with antimony, arsenic, bismuth, copper, gallium or germanium, in particular with antimony, or the corresponding oxides. The doping can amount to 0.5–50% by weight, preferably 0.5–40% by weight, in particular 0.5–20% by weight, based on the tin dioxide. The tin dioxide coating may be a conductive or non conductive coating.

Transparent thermoplastics doped with such pigments in a pure colouration exhibit slight metallic shimmering, but retain their transparency. The addition of from 0.2 to 10% by weight, preferably from 0.5 to 3% by weight, of opaque pigments, for example titanium dioxide, can, if required, completely hide this metallic sheen, in particular in the case of thermoplastic polyurethane. Furthermore, coloured pigments which allow colour variations of all types and simultaneously ensure retention of the laser marking, can be added to the plastics.

The pigments suitable for the marking and their preparation processes are described, for example, in DE-A 38 42 330 and EP 0 139 557. The pigments are preferably based on platelet-shaped, preferably transparent or semi-transparent substrates of, for example, phyllosilicates, such as, for example, mica, talc, kaolin, glass, $SiO_2$ flakes, synthetic or ceramic flakes or synthetic support-free platelets. Also suitable are metal platelets, for example aluminium platelets, or platelet-shaped metal oxides, for example iron oxide or bismuth oxychloride. The particularly preferred substrate comprises mica flakes coated with one or more metal oxides. The metal oxides used here are either colourless, high-refraction metal oxides, such as, in particular, titanium dioxide and/or zirconium dioxide, or coloured metal oxides, for example chromium oxide, nickel oxide, copper oxide, cobalt oxide and in particular iron oxides.

The tin dioxide coating is applied to the substrate in a manner known per se, for example by the method described in EP 0 139 557. The coating of tin dioxide doped with antimony, arsenic, bismuth, copper, gallium or germanium is applied to the platelet-shaped substrate in an amount of about 25–100%, in particular in an amount of about 50–75%.

Pigments which are particularly suitable for laser marking are those based on platelet-shaped metal oxides or platelet-shaped substrates, preferably mica, coated with one or more metal oxides. Particularly suitable pigments are those which are distinguished by the fact that the base substrate is first coated with an optionally hydrated silicon dioxide coating before the doped tin dioxide coating is applied. Such pigments are described in DE 38 42 330. In this case, the substrate is suspended in water and the solution of a soluble silicate is added at a suitable pH; if necessary, the pH is kept in the suitable range by simultaneous addition of acid. The silicic acid-coated substrate can be separated off from the suspension before the subsequent coating with the tin dioxide coating and worked up or coated directly with the doped tin dioxide coating.

All known thermoplastics, as described, for example, in Ullmann, Vol. 15, pp. 457 ff., published by VCH, can be used for laser marking. Examples of suitable plastics are polyethylene, polypropylene, polyamides, polyesters, polyester esters, polyether esters, polyphenylene ethers, polyacetal, polybutylene terephthalate, polymethyl methacrylate, polyvinyl acetal, polystyrene, acrylonitrile-butadiene-styrene (ABS), acrylonitrile-styrene-acrylate (ASA), polycarbonate, polyether sulphones, polyether ketones and copolymers and/or mixtures thereof. Particularly suitable are thermoplastic polyurethanes (TPUs) owing to their good mechanical properties and the inexpensive processing methods. Thermoplastic polyurethanes have long been known from numerous patents and other publications, for example from GB 1,057,018 and EP 0 564 931.

The pigments are incorporated into the thermoplastic by mixing the plastic granules with the pigment and then moulding the mixture at elevated temperature. If necessary, adhesives, organic polymer-compatible solvents, stabilizers and/or surfactants which are heat-stable under the working conditions can be added to the plastic granules during incorporation of the pigments. The plastic granule/pigment mixture is generally prepared by introducing the plastic granules into a suitable mixer, wetting the granules with any additives and then adding and admixing the pigment. The pigmentation of plastic is generally carried out via a colour concentrate (masterbatch) or compound. The resultant mixture can then be processed directly in an extruder or injection-moulding machine. The mouldings formed on processing exhibit very homogeneous distribution of the pigment. The laser marking is then carried out.

The invention also relates to a process for the preparation of the novel laser-markable plastics, characterized in that a thermoplastic is mixed with the pigment and then moulded at elevated temperature.

The inscription with the laser is carried out by introducing the test specimen into the ray path of a pulsed laser, preferably an Nd-YAG laser. Inscription using an excimer laser is also possible, for example by means of a mask technique. However, the desired results can also be achieved using other conventional types of laser which have a wavelength in a region of high absorption of the pigment used. The marking obtained is determined by the irradiation time (or pulse number in the case of pulsed lasers) and irradiation output of the laser and of the plastic system used. The output of the laser used depends on the particular application and can readily be determined in the individual case by a person skilled in the art.

The novel pigmented plastic can be used in all areas where printing processes have hitherto been employed for the inscription of plastics. For example, mouldings of the novel plastic can be used in the electrical, electronics and motor vehicle industries. The labelling and inscription of, for example, cables, wires, trim strips or functional parts in the heating, ventilation and cooling sectors or switches, plugs, levers and handles comprising the novel plastic is possible even at poorly accessible points with the aid of laser light. Owing to its low heavy-metal content, the novel plastic system can furthermore be employed in packaging in the foodstuffs sector or in the toys sector. The markings on packaging are distinguished by the fact that they are wipe- and scratch-resistant, stable during subsequent sterilization processes, and can be applied in a hygienically pure manner during the marking process. Complete label motifs can be applied durably to the packaging for a reusable system. A further important area of application for laser inscription comprises plastic marks for the individual tagging of animals, known as cattle tags or ear marks. Via a bar-code system, the information specific to the animal is stored and can then be recalled again, when required, with the aid of a scanner. The inscription must be very durable since the marks in some cases remain on the animals for a number of years.

It is thus possible to laser-mark plastic articles or mouldings comprising the novel plastic.

The examples below are intended to illustrate the invention, but without representing a limitation. Percentages are by weight.

EXAMPLES

Example 1

Yellow injection mouldings are produced from a thermoplastic polyether-polyurethane having a Shore hardness of 85A, based on 1000 parts of polytetrahydrofuran having a molecular weight of 1000, 600 parts of MDI (methylenediphenyl 4,4'-diisocyanate) and 126 parts of 1,4-butanediol, and contain 1% of the mica pigment Minatec® 31 CM ($TiO_2$ mica pigment having an antimony-doped tin dioxide coating, commercial product from E. Merck, Darmstadt), 0.6% of titanium dioxide and 0.25% of Quinophthalone Yellow (Paliothol® K 0691 from BASF). The pigments are added to the polyether-TPU in the form of concentrates before the injection-moulding operation. After the inscription by means of an Nd-YAG laser at a current strength of 15 A and a writing speed of 400 mm/s, the tablets exhibit a clear, abrasion-resistant inscription. The reflection values, measured using a PSC quick-check 300 and a 670 nm reading pen, are 66% on the matrix and 21% in inscribed areas. A bar code is readily readable.

| Mechanical properties | | | |
| --- | --- | --- | --- |
| Tensile strength/MPa DIN 53504 | Elongation at break/% DIN 53504 | Shore A hardness DIN 53505 | Abrasion/$mm^3$ DIN 53516 |
| 50 | 650 | 85 | 30 |

Example 2

Orange injection mouldings are produced from a thermoplastic polyether-polyurethane having a Shore hardness of 90A, based on 1000 parts of polytetrahydrofuran having a molecular weight of 1000, 700 parts of MDI and 162 parts of 1,4-butanediol, and contain 1% of the mica pigment Minatec® 30 CM ($SiO_2$-coated $TiO_2$ mica pigment having an antimony-doped tin dioxide coating commercial product from Merck, Darmstadt), 0.6% of titanium dioxide and 0.5% of lead chromate pigment (Krolor Yellow 787 D) and 0.1% of lead molybdate pigment (Krolor Orange 789 D). The pigments are added to the polyether-TPU in the form of concentrates before the injection-moulding operation.

The inscription by means of an Nd-YAG laser at 13 amperes, a pulse frequency of 5 kHz and at 600 mm/s is high in contrast and abrasion-resistant.

The reflection values using the PSC 300 are 56% on the matrix and 25% in the inscribed areas.

Example 3

Orange injection mouldings are produced from a thermoplastic polyether-polyurethane having a Shore hardness of 95A, based on 1000 parts of polytetrahydrofuran having a molecular weight of 1000, 830 parts of MDI and 209 parts of 1,4-butanediol, and 2% of a UV stabilizer concentrate. In addition, the tablets contain 1% of the mica pigment Minatec® 31 CM, 0.6% of titanium dioxide and 0.25% of Quinophthalone Yellow and 0.02% of the azo pigment Paliothol Yellow K 2270. The pigments are added to the polyether-TPU in the form of concentrates before the injection-moulding operation.

The inscription by means of an Nd-YAG laser at 18 amperes and 600 mm/s is high in contrast and abrasion-resistant.

The reflection values using the PSC 300 are 67% on the matrix and 24% in the inscribed areas.

Example 4

White injection mouldings are produced from a polyether-polyurethane having a Shore hardness of 90A, and contain 1% of the mica pigment Minatec® 31 CM and 1% of titanium dioxide. The pigments are added to the polyether TPU in the form of concentrates before the injection-moulding operation.

The inscription by means of an Nd-YAG laser at 14 amperes, a pulse frequency of 5 kHz and at 400 mm/s is high in contrast and abrasion-resistant.

The reflection values using the PSC 300 are 68% on the matrix and 28% in the inscribed areas.

Example 5

Yellow injection mouldings are produced from a polyether ester having a Shore hardness of 42D, based on polytetrahydrofuran and polybutylene therephthalate [sic]. The tablets contain 1% of the mica pigment Minatec® 31 CM, 0.6% of titanium dioxide and 0.25% of Quinophthalone Yellow. The pigments are added in the form of concentrates before the injection-moulding operation.

A high-contrast inscription is applied by means of an Nd-YAG laser.

Example 6

Yellow injection mouldings are produced from a polyester ester having a Shore hardness of 55D, based on polybutylene terephthalate and polycaprolactone. The tablets contain 1.5% of the mica pigment Minatec® 31 CM, 0.6% of titanium dioxide and 0.25% of Quinophthalone Yellow. The pigments are added in the form of concentrates before the injection-moulding operation.

A high-contrast inscription is applied by means of an Nd-YAG laser.

Example 7

Orange injection mouldings are produced from a polyester-polyurethane having a Shore hardness of 90A, based on 100 parts of poly(1,4-butanediol)-hexane-1,6-diol adipate having a molecular weight of 2000, 580 parts of MDI and 162 parts of 1,4-butanediol and contain 1.5% of the mica pigment Minatec® 30 CM, 0.6% of titanium dioxide, 0.5% of lead chromate pigment (Krolor Yellow 787 D) and 0.1% of lead molybdate pigment (Krolor Orange 789 D). The pigments are added to the polyether-TPU in the form of concentrates before the injection-moulding operation.

The inscription by means of an Nd-YAG laser is durable and high in contrast.

Example 8

Plugs produced from a moulding composition comprising polyamide (Ultramid® A3K BASF, Ludwigshafen) and 0.3% of Minatec® 30 CM are provided with a dark inscription on a white background. The inscription by means of an Nd-YAG laser gives clean and smooth motifs. The colour change occurring close to the pigment is very clear in the polyamide without any significant change to the polymer.

Example 9

Light switches produced from a moulding composition comprising polyacetal (Hostaform® C902, from Hoechst) and 1% of Minatec® 31 CM are provided with a grey marking on a white background by means of the Nd-YAG laser.

Example 10

Films comprising polypropylene (PPH10 from DSM) and 1% of Minatec® 30 CM are provided with a sharp-edged marking by means of the Nd-YAG laser, the backing material exhibiting no foaming effect.

Comparative Example 1

Yellow injection mouldings are produced from a thermoplastic polyether-polyurethane having a Shore hardness of 95A, based on 1000 parts of polytetrahydrofuran having a molecular weight of 1000, 830 parts of MDI and 209 parts of 1,4-butanediol, and 2% of a UV stabilizer concentrate. In addition, the tablets contain 0.6% of titanium dioxide and 0.25% of Quinophthalone Yellow and 0.02% of the azo pigment Paliothol Yellow K 2270. The pigments are added to the polyether TPU in the form of concentrates before the injection-moulding operation.

The composition and colouring correspond to Example 3, but there is no laser contrasting agent. Inscription by means of an Nd-YAG laser is impossible.

Comparative Example 2

Yellow injection mouldings are produced from a thermoplastic polyether-polyurethane having a Shore hardness of 95A, based on 1000 parts of polytetrahydrofuran having a molecular weight of 1000, 830 parts of MDI and 209 parts of 1,4-butanediol, and 2% of a UV stabilizer concentrate. In addition, the tablets contain 5% of antimony trioxide, 0.6% of titanium dioxide and 0.25% of Quinophthalone and 0.02% of the azo pigment Paliothol® Yellow K 2270. The pigments are added to the polyether PTU in the form of concentates before the injection-moulding operation.

The composition and colouring correspond to Example 3, apart from the laser contrasting agent, and to Comparative Example 1.

The inscription is carried out by means of an Nd-YAG laser at 18 amperes and 600 mm/s.

The reflection values using the psc 300 are 69% on the matrix and 22% in the inscribed areas.

What is claimed is:

1. A laser-markable plastic which comprises a thermoplastic containing a pigment having a coating of doped tin dioxide, wherein the proportion of the pigment is 0.1–3% by weight based on the plastic.

2. A laser-markable plastic according to claim 1, wherein the pigment is based on a platelet-shaped substrate.

3. A laser-markable plastic according to claim 1, wherein the platelet-shaped substrate is mica platelets, $SiO_2$ flakes or mica platelets coated with one or more metal oxides.

4. A laser-markable plastic which comprises a thermoplastic containing a pigment having a platelet-shaped substrate which has been coated with an optionally hydrated silicon dioxide coating or a coating of another insoluble silicate and over that coating another coating of doped tin dioxide.

5. A laser-markable plastic according to claim 1, wherein the proportion of pigment is 0.1–2% by weight, based on the plastic.

6. A laser-markable plastic according to claim 1, wherein the tin dioxide coating of the pigment is doped with 0.5–50% by weight of antimony, arsenic, bismuth, copper, gallium, germanium, or a corresponding oxide thereof.

7. A laser markable plastic according to claim 1, wherein the thermoplastic is a thermoplastic polyurethane.

8. A laser-markable plastic according to claim 1, wherein the thermoplastic is a polyether ester or polyester ester.

9. A laser-markable plastic according to claim 1, which additionally comprises a colored pigment.

10. A process for the preparation of a laser-markable plastic according to claim 1, which comprises mixing granules of the thermoplastic with the pigment and then molding at elevated temperature.

11. A plastic molding comprising a laser-markable plastic according to claim 1.

12. A method for making a molding laser-markable which comprises incorporating in the molding a laser-markable plastic according to claim 1.

13. A laser-markable plastic according to claim 1 which is markable by a Nd-YAG laser.

14. A laser-markable plastic according to claim 1, wherein the plastic further comprises from 0.2 to 10% by weight of one or more opaque pigments.

* * * * *